United States Patent [19]
Yamaguchi et al.

[11] Patent Number: 5,422,866
[45] Date of Patent: Jun. 6, 1995

[54] MAGNETO-OPTICAL HEAD WITH BIREFRINGENT POLARIZER

[75] Inventors: Susumu Yamaguchi; Katsuya Yagi; Toshihiko Kiriki, all of Hachioji, Japan

[73] Assignee: Konica Corporation, Tokyo, Japan

[21] Appl. No.: 261,959

[22] Filed: Jun. 17, 1994

[30] Foreign Application Priority Data

Jul. 15, 1993 [JP] Japan .................................. 5-196741

[51] Int. Cl.⁶ .......................... G11B 11/00; G11B 7/00
[52] U.S. Cl. .................................. 369/13; 369/44.14; 369/112
[58] Field of Search ................. 369/13, 110, 112, 116, 369/44.12, 44.23, 44.37, 44.38, 109, 118, 44.14, 44.41, 44.24, 44.11; 360/114, 59; 359/487, 494

[56] References Cited

U.S. PATENT DOCUMENTS 5,132,950 7/1992 Sato et al. .................. 369/44.14
5,272,685 12/1993 Ando .......................... 369/44.14

FOREIGN PATENT DOCUMENTS 63-113503  5/1988  Japan .
63-187441  8/1988  Japan .
5-142419   6/1993  Japan .
5-142420   6/1993  Japan .
5-142421   6/1993  Japan .

Primary Examiner—Ali Neyzari
Attorney, Agent, or Firm—Finnegan, Henderson, Farabow, Garrett & Dunner

[57] ABSTRACT

An magneto-optical head that detects information recorded magneto-optically in accordance with changes in polarization conditions of light reflected from a magneto-optical recording medium on which convergent light is projected, includes a birefringent polarizer having a plane of incidence on which a polarization-separation coating is formed and a plane of emergence that is substantially in parallel with the plane of incidence. The birefringent polarizer composed of at least two crystallines is arranged to be inclined to an optical path along which the reflected light advances toward a photodetector as a convergent light. A chief ray of reflected light from a recording medium enters the plane of incidence of the birefringent polarizer with an incident angle between 55° and 70°.

9 Claims, 7 Drawing Sheets

MAGNETO-OPTICAL HEAD WITH BIREFRINGENT POLARIZER

BACKGROUND OF THE INVENTION

The present invention relates to a magneto-optical head, and in particular, to a magneto-optical head employing a birefringent polarizer composed of crystallines.

Recording and reproducing on a magneto-optical disk are carried out through detection of changes in polarization conditions of an incident light, as widely known. In this case, it is normal that a Wollaston prism shown in FIGS. 7 and 8 is used or 3-beam-separation Wollaston prism shown in FIGS. 9 and 10 is used as a magneto-optical head employing a birefringent polarizer wherein at least two crystallines are cemented (See Japanese Patent Publication Open to Public Inspection No. 187441/1988 (hereinafter referred to as Japanese Patent O.P.I. Publication)).

In the magneto-optical head shown in FIGS. 7 and 8, a laser beam having a linearly polarized light is collimated by collimating lens 2 and passes through polarization beam splitter 3, then, projected on a recording surface of magneto-optical disk D by objective lens 4'. Reflected light subjected to changes in polarization conditions in accordance with recording information of the magneto-optical disk D is passed through the objective lens 4', deflected from its incident light path by the polarization beam splitter 3, subjected to rotation by 45° of its direction of linearly polarized light by half-wave plate 5, passed through condenser lens 6 and cylindrical lens 7, and then divided by the Wollaston prism 8 into first and second beams B1 and B2 which change their intensities in phases opposite to each other in accordance with their polarization conditions. The beams B1 and B2 enter photodetector 9' that is provided with photodetecting elements 91' and 92' which receive the beams B1 and B2 respectively. Thereby, information recorded on the magneto-optical disk D is detected through a difference of output between photodetecting elements 91', and 92' and focusing error signals and tracking error signals are detected through output of the photodetecting element 91'. An illustrated example shows that detection of focusing error signals is carried out in an astigmatism method by means of the condenser lens 6 and the cylindrical lens 7, while detection of tracking error signals is carried out in a push-pull method.

In the magneto-optical head shown in FIGS. 9 and 10, light is reflected from the magneto-optical disk D and deflected from its incident light path by the polarization beam splitter 3 in a manner similar to the aforementioned conventional example. The light passes through condenser lens 6 and cylindrical lens 7 and is divided by the Wollaston prism 8 of a 3-beam-separation type into first and second beams B1 and B2 which deviate to both sides and change their intensities in phases opposite to each other in accordance with their polarization conditions and into third beam B3 which advances along the center and without changing intensity in accordance with polarization conditions. The beams B1, B2 and B3 enter photodetector 9" provided with photodetecting elements 91", 92" and 93 which respectively receive the beams B1, B2 and B3. Thereby, information recorded on the magneto-optical disk D is detected through a difference of output between photodetecting elements 91" and 92", and focusing error signals and tracking error signals are detected through output of the photodetecting element 93". An illustrated example also shows that detection of focusing error signals is carried out in an astigmatism method, while detection of tracking error signals is carried out in a push-pull method.

An optical system in the conventional example mentioned above requires expensive polarization beam splitter 3 in addition to birefringent polarizer 8, and separate optical parts for generation of astigmatism such as a cylindrical lens and other parts. This optical system of an magneto-optical head has disadvantages, because it is large in size and expensive.

SUMMARY OF THE INVENTION

An object of the invention is to eliminate disadvantages of an optical system employing a birefringent polarizer and to provide a magneto-optical head which is small in size and inexpensive.

An embodiment of a magneto-optical head of the invention represents a magneto-optical head that detects information recorded magneto-optically in accordance with changes in polarization conditions of light reflected from a magneto-optical recording medium on which convergent light is projected. In the magneto-optical head, a birefringent polarizer having a plane of incidence on which a polarization-separation coating is formed and a plane of emergence that is almost in parallel with the plane of incidence and being composed of at least two crystallines is arranged to be inclined to an optical path along which the aforesaid reflected light advances toward a photodetector as a convergent light. Because of this construction, a polarization beam splitter and a lens system for generating astigmatism are not needed.

BRIEF DESCRIPTION OF THE INVENTION

DETAILED DESCRIPTION OF THE PREFERRED EMBODIMENTS

A magneto-optical head of the invention will be explained in detail as follows, referring to examples.

Figure 1:
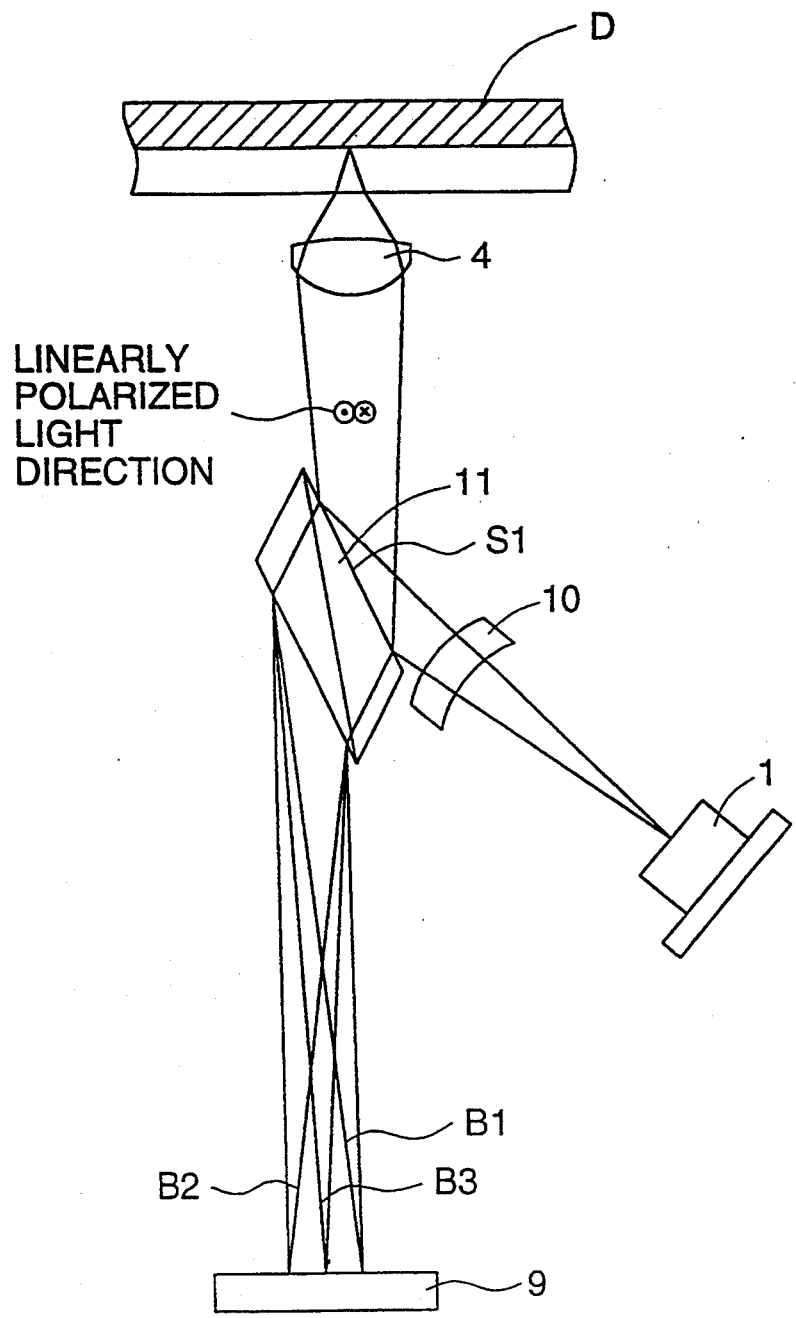
FIG. 1 is an optical arrangement plan showing an example of a magneto-optical head of the invention.
Figure 2:
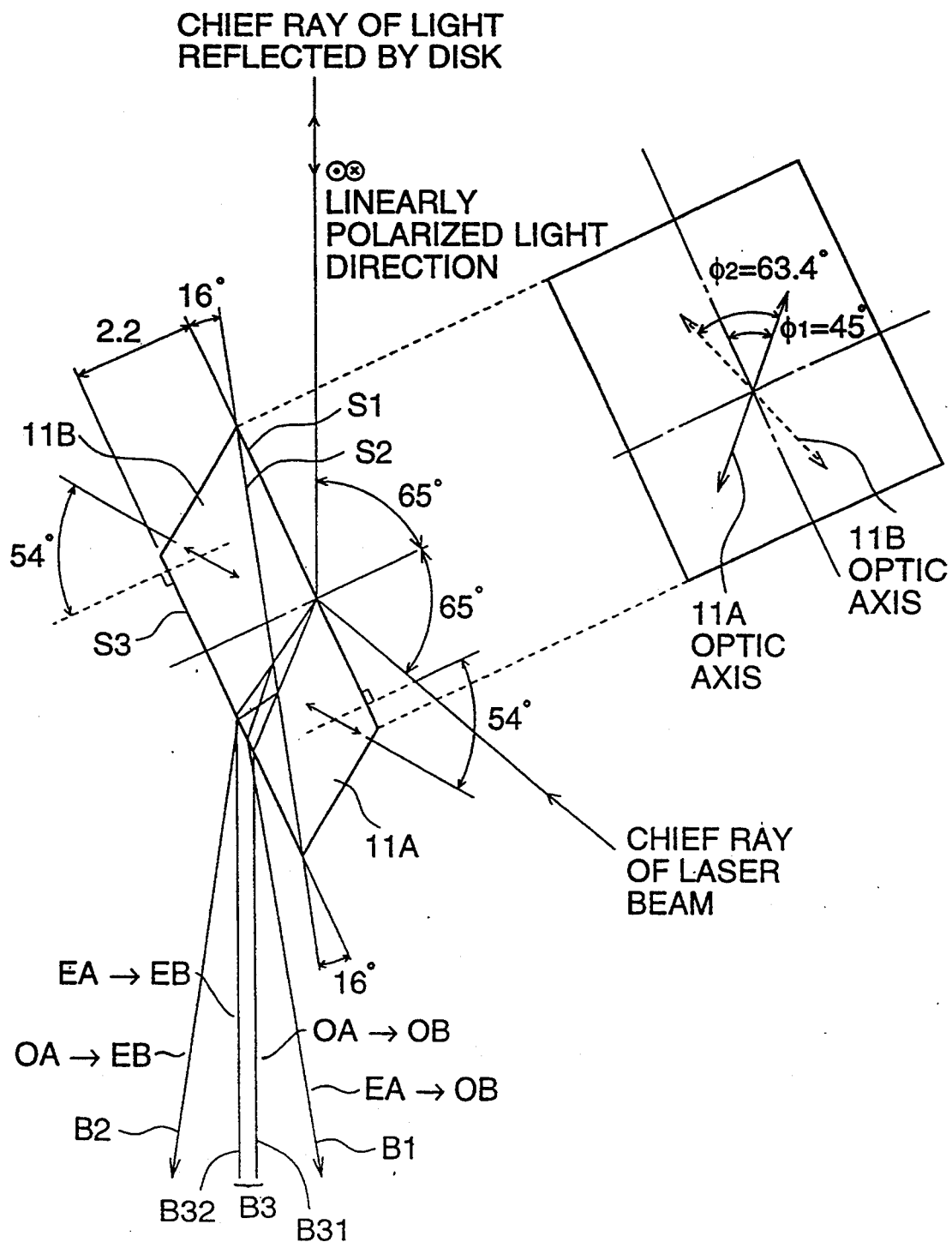
FIG. 2 is an illustration of functions of a birefringent polarizer employing a magneto-optical head of the invention.
Figure 3:
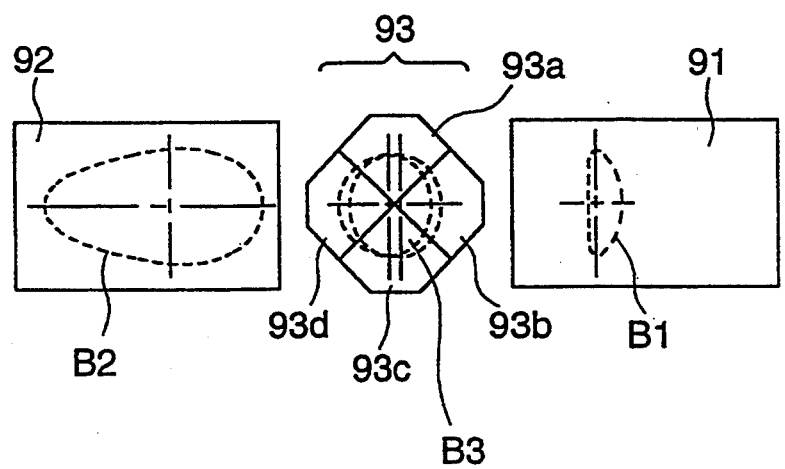
FIG. 3 is a top view showing an arrangement of a photodetecting element of a photodetector used in a magneto-optical head of the invention and showing a shape of a light spot.

Each of FIGS. 1, 2 and 3 shows a first example of the invention.

A laser beam which is emitted from semiconductor laser 1 and has a linearly polarized light is moderated in terms of divergence angle by coupling lens 10. The beam is reflected on polarization-separation coating surface S1 of birefringent polarizer 11, and is converged by objective lens 4 having the magnification of 9 on a recording surface of magneto-optical disk D. Reflected light subjected to changes of polarization conditions in accordance with information recorded on the magneto-optical disk D is converged by objective lens 4 converged bundle of light which is transmitted through the surface S1 of birefringent polarizer 11, deflected from the aforesaid incident light path, and then divided by birefringence action of the birefringent polarizer into first and second beams B1 and B2 which change their intensities to be opposite in terms of phase with each other in accordance with changes in polarization conditions of light reflecting on the disk and into third beam B3 which does not change intensity in accordance with changes in polarization conditions the beams B1, B2, B3 enter photodetector 9. To be exact, B3 is divided into two rays B31 and B32 which are parallel with each other and change their intensities to be opposite in terms of phase in accordance with changes in polarization conditions of light reflected on the disk, and the sum of light amount of the two rays is constant.

Figure 4:
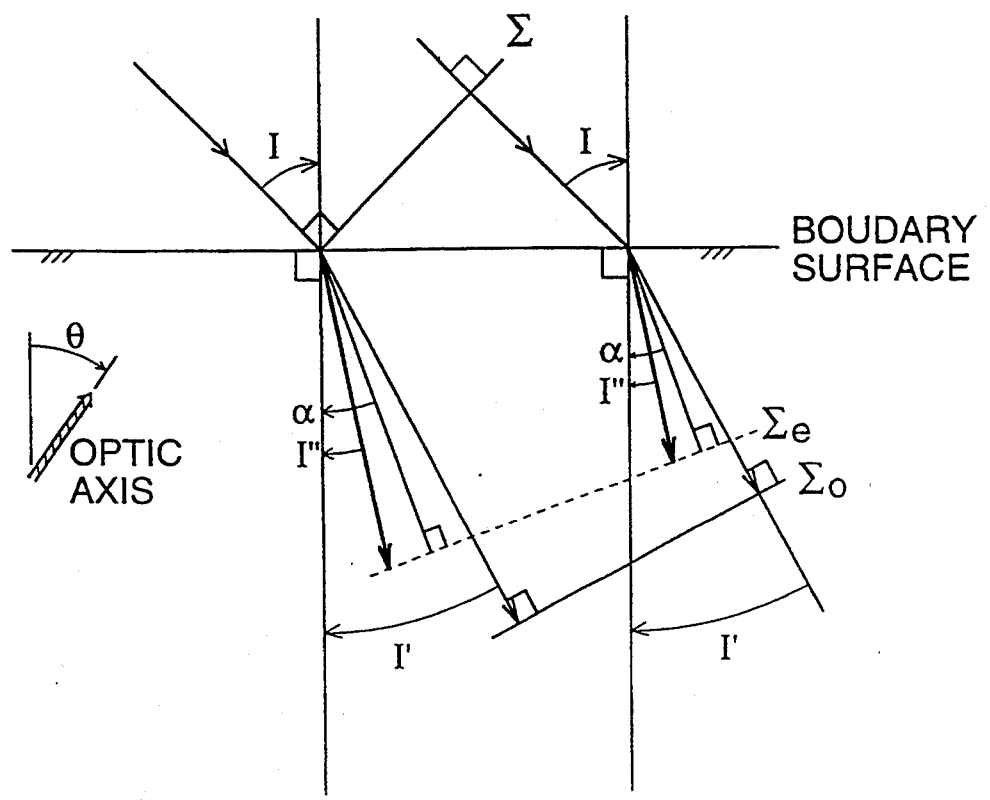
FIG. 4 is an illustration for refraction action of a birefringent medium.

Before describing behaviors of rays in a birefringent polarizer, a behavior in a birefringent medium (uniaxial crystal) shown by a ray entering a boundary surface with incident angle I will be explained referring to FIG. 4. Let it be assumed that a refractive index of a medium at the incidence side is 1 and an optic axis of the crystal is in parallel with the page surface, so that the explanation may be simple.

The incident light (wave surface $\Sigma$) is divided into an ordinary ray having polarization component oscillating in the direction perpendicular to the optic axis of the uniaxial crystal (refractive index no is constant regardless of directions of the ray in the crystal) and an extraordinary ray having polarization component oscillating in the direction of a principal plane that includes the optic axis and the ordinary ray (refractive index n changes depending on the ray directions in the crystal). When the extraordinary ray advances in the direction of the optic axis, its refractive index is aligned with that of the ordinary ray satisfying $n=n_o$, while when advancing in the direction perpendicular to the optic axis, the relation of $n=n_e$ is satisfied. In the case of a crystal quartz, $n_o=1.5388$ and $n_e=1.5477$ ($\lambda=780$ nm) are satisfied.

In the case of the ordinary ray (refractive index no), its direction is perpendicular to the wave surface $\Sigma_o$ under a law of refraction $\sin I = n_o \sin I'$. When considering the extraordinary ray, it is necessary to determine that it does not follow the law of refraction showing its direction which is not perpendicular to the wave surface $\Sigma e$. In the case of the extraordinary ray, the direction of a normal line to the wave surface $\Sigma e$ only follows the law of refraction. Under the assumption that n represents a refractive index of the extraordinary ray, $\theta$ represents an angle formed by the optic axis direction of a birefringent medium and a normal line to a boundary surface, $\alpha$ represents an angle formed by a normal line to the wave surface $\Sigma e$ and that to the boundary surface, the following relations are satisfied.

$\sin I = n \cdot \sin \alpha$ $1/n^2 = \sin^2(\theta+\alpha)/n_e^2 + \cos^2(\theta+\alpha)/n_o^2$ In the above expressions, the variable other than n and $\alpha$ are known, and thereby direction of wave surface $\alpha$ and refractive index n of an ordinary ray can be obtained. Under the assumption that $I''$ represents an angle formed by the extraordinary ray direction and a normal line to the boundary surface, it is possible to obtain $I''$ from the following relation.

$\tan(\theta+I'') = (n_o^2/n_e^2) \cdot \tan(\theta+\alpha)$

The expressions for calculation mentioned above are known from various documents including, for example, "Polarization ray tracing in birefringent media (OPTICAL ENGINEERING/April 1991/vol. 30 NO. 4)".

It is possible, through application of the aforementioned expressions, to calculate the advancing direction of a ray resulting from birefringence actions in a birefringent polarizer. In the present example, a birefringent polarizer wherein two crystal quartz prisms 11A and 11B are cemented as shown in FIG. 2 was used. An apex angle of each prism and an angle formed by an optic axis and a plane of incidence (plane of emergence) are as shown in the figure. Incidentally, plane of incidence S1 and plane of emergence S3 are in parallel with each other. The ray refracted through the surface S1 is divided into ordinary ray (OA) and extraordinary ray (EA) in crystal quartz prism 11A. Each of these two rays is further divided into ordinary ray (OB) and extraordinary ray (EB) through boundary surface S2 between crystal quartz prism 11A and crystal quartz prism 11B. Therefore, ray (OA→OB) continuing to be in ordinary state at the boundary surface and ray (EA→EB) continuing to be in extraordinary state at the boundary surface advance straight without being deflected in their optical paths, while, ray (OA→EB) changing from ordinary ray to extraordinary ray and that (EA→OB) changing from extraordinary ray to ordinary ray are deflected at the boundary surface under the law of refraction. As a result, rays passing through the birefringent polarizer are divided into four rays B1, B2, B31 and B32. A separation angle between B1 and B2 in the present example is about 1.1°. A separation distance between B31 and B32, on the other hand, is small to be about 6 μm which can be regarded substantially as one line of ray B3.

The intensity ratio of three lines (4 lines) of rays B1, B2 and B3 (B31 + B32) can be set arbitrarily by setting angles $\phi_1$ and $\phi_2$ formed between a linearly polarized light direction and an optic axis of a crystal quartz. It is known from Japanese Patent O.P.I. Publication No. 187441/1988 and Japanese Patent Examined Publication No. 113503/1988 that the intensity ratio is dependent on $\phi_1$ and $\phi_2$. Under the assumption of $\phi_1=45°$ and $\phi_2=63.4°$ as in the example, the relation of B1:B3:B2=2:1:2 results from the situation where the linear polarization direction of incident light is like that shown in FIG. 2. Though it is possible theoretically to detect signals regardless of the intensity ratio of three beams, it is preferable, for the highly reliable detection of recorded information, that B1 and B2 are greater than B3 in terms of intensity and the ratio of B1/B2 is 1/1, because the change (concretely, minute rotation of linearly polarized light direction) in polarization conditions of light reflected on magneto-optical disk D is small.

Some crystallines have properties to rotate the direction of an oscillation plane (optical activity) for linearly polarized light passing through the crystalline. A crystal quartz used in the present example is a typical uniaxial crystal having the optical activity, and polarization direction of light advancing through the crystal quartz in its optic axis direction is rotated accordingly. Since the role of a magneto-optical head is to read a minute angle rotation of linearly polarized light direction for light reflected on a disk, the reading power of the magneto-optical head is deteriorated when a birefringent polarizer has the optical activity. To reduce that influence on such deterioration of the magneto-optical head, it is preferable that an optic axis of the crystal is almost perpendicular to the direction of light in the crystal as shown in the present example. In this case, an angle formed between an optic axis and a normal line to a plane of incidence is 54°.

Next, with regard to polarization-separation coating on plane of incidence S1 of a birefringent polarizer used in the present example, the relation of 50%≦Rs≦85% is preferable for S-polarization component reflectivity (Rs) when the balance between beam utilization efficiency and an amount of light reflected on a disk and entering a photodetector is considered. With regard to P-polarization component transmissivity (Tp), on the other hand, the relation of Tp≧90% is preferable when C/N of a magneto-optical reproducing signal is considered because P-polarization component corresponds to components of magneto-optical reproducing signals generated by the minute rotation of light reflected on a disk in the direction of linear polarization.

Further, with regard to transmission retardation between S-polarization components and P-polarization components of the polarization-separation coating, it needs to be lowered to the level in the neighborhood of 0° for preventing C/N deterioration of magneto-optical reproducing signals. The retardation satisfying the relation of phase difference ≦10° actually causes no problem because its C/N deterioration is not more than 2%.

In the example, an incident angle of a chief ray entering a birefringent polarizer is 65°, which is because an incident angle of 55° or more requires a coating having desirable polarization-separation characteristics that is less expensive than a coating for an incident angle that is in the neighborhood of 45°. Actually, a desirable coating can be obtained through the following coating structure.

H: $TiO_2$ [n=2.3 (λ=780 nm)]
M: Mixture containing metallic oxide as a principal ingredient [n=1.67 (λ=780 nm)]
L: $MgF_2$ [n=1.38 (λ=780 nm)]

wherein, a coating thickness of each substance is λ/4 (λ=780 nm).

TABLE 1

| Coating structure | Incident angle (°) | Rs (%) | Tp (%) | Retardation (°) |
| --- | --- | --- | --- | --- |
| ① Crystal quartz/MLH | 61.5 | 73.6 | 90.6 | −0.7 |
|  | 65 | 76.6 | 94.3 | 0 |
|  | 68.5 | 79.7 | 97.5 | +0.7 |
| ② Crystal quartz/3 (HL)H | 61.5 | 80.6 | 93.2 | −4.2 |
|  | 65 | 83.5 | 96.8 | 0 |

TABLE 1-continued

| Coating structure | Incident angle (°) | Rs (%) | Tp (%) | Retardation (°) |
| --- | --- | --- | --- | --- |
|  | 68.5 | 86.0 | 99.2 | +4.7 |
| ③ Crystal quartz/H | 61.5 | 58.2 | 95.0 | −0.1 |
|  | 65 | 62.2 | 97.4 | 0.0 |
|  | 68.5 | 66.4 | 99.2 | 0.1 |
|  | 60 | 56.7 | 93.9 | 0.0 |
|  | 55 | 51.9 | 90.2 | 0.0 |
|  | 45 | 44.0 | 83.3 | 0.0 |

Note)
Values in columns of Rs, Tp and retardation in the table were obtained by calculating for incident angles of 65° and 65 ± 3.5°, considering a convergent light.

From the viewpoint of polarization-separation characteristics and cost, a coating on Item ① above is acceptable. When greater Rs is required, a coating of Item ② above can be used. When cost has priority over other characteristics, a coating of Item ③ can be used. In the case of a coating of Item ③ above, although desired polarization-separation characteristics can be obtained even under the condition of an incident angle of 55°, the preferable incident angle is 60° or more. When the incident angle is 45°, it is not possible to obtain desirable performance. Namely, an incident angle in the neighborhood of 45° does not allow the coating structure to be inexpensive.

With regard to an antireflective coating on S3 surface of a birefringent polarizer, it is easy to attain an antireflective coating satisfying transmissivity ≧95% or so in the present example (incident angle 65°, λ=780 nm). However, as the incident angle increases, more coating layers are required, resulting in a complicated and expensive structure. Namely, when establishing an incident angle for the chief ray of reflected light from a magneto-optical disk entering the birefringent polarizer, it is necessary to consider the balance of the relative difficulty between polarization-separation coating on S1 surface and antireflective coating on S3 surface, and an incident angle ranging between 55° and 70° is preferable.

FIG. 3 shows a shape of a photodetecting element on photodetector 9 used in the present example and a shape of a spot on the photodetector that is formed when a laser beam is focused on a recording surface of magneto-optical disk D. The photodetector is located at the position which makes a spot of light B3 (B31+B32) to be almost a circle having a diameter of about 80 μm. Since a diameter of a spot of B3 is much larger than a separation distance of 6 μm between B31 and B32, no problem is caused in signal detection. Further, on the light B3, there is generated an astigmatism caused by convergent light passing through a birefringent polarizer whose planes are almost in parallel with each other. The astigmatism, therefore, can be used for focusing error detection by means of an astigmatism method. With regard to B1 and B2, they are different from B3 in terms of generation of an astigmatism because of a difference of an optical path length caused by birefringence in a birefringent polarizer. Therefore, the shapes of three spots created different from each other. A spot of B3 is elongated vertically or horizontally in FIG. 3 when the disk D gets out of focus.

On a diagram, an output of focusing error signals forms an S-shaped curve as a position of an objective lens is changed. It is not preferable in terms of stability of servo that a peak-to-peak displacement is too small or too great. It is appropriate that a peak-to-peak displacement is about 7 μm–10 μm. Since an incident angle of light reflected on a disk is 65° against a birefringent polarizer and the thickness of the prism is 2.2 mm in the present example, an amount of an astigmatism of light B3 is about 1.3 mm. This amount, when it is converted to a distance between a disk and an objective lens, namely to a peak-to-peak displacement on a S-shaped curve, corresponds to about 8 $\mu$m which is within the range of 7 $\mu$m–10 $\mu$m mentioned above, because the objective lens has its magnification of 9. In the case of the present example, when a peak-to-peak displacement is required to be a desirable value, it is necessary to select appropriate values for magnification of an objective lens, an incident angle to a birefringent polarizer and a thickness of the birefringent polarizer, taking the total size of a magneto-optical head into consideration.

In a magneto-optical head, a spot on a photodetector also moves as an objective lens moves during tracking. To avoid having this movement of a spot serve as an error factor for focusing error signals obtained from quarterly-divided photodetecting element 93, it is advisable that the direction of division lines agrees with that of tracking. For that purpose, it is also advisable that a plane containing a normal line to the plane of incidence S1 of birefringent polarizer 11 and a chief ray of incident light is inclined at 45° to the tracking direction.

In the present example, an astigmatism method is used for detection of focusing error signals (FE), a push-pull method is used for detection of tracking error signals (TE), and a differential detecting method is used for magneto-optical reproducing signals (MO). The foregoing will be explained as follows, referring to the photodetector shown in FIG. 3. Detection of the aforesaid various signals can be made through calculation of the following expressions;

$$FE=(93a+93c)-(93b+93d)$$

$$TE=(93a+93b)-(93c+93d)$$

$$MO=91-92$$

wherein, light-receiving output in each of areas 93a–93d on quarterly-divided photodetecting element 93 is expressed with a sign of each area, and addition of output signal is expressed with "+", while subtraction of the same is expressed with "−".

Figure 5:
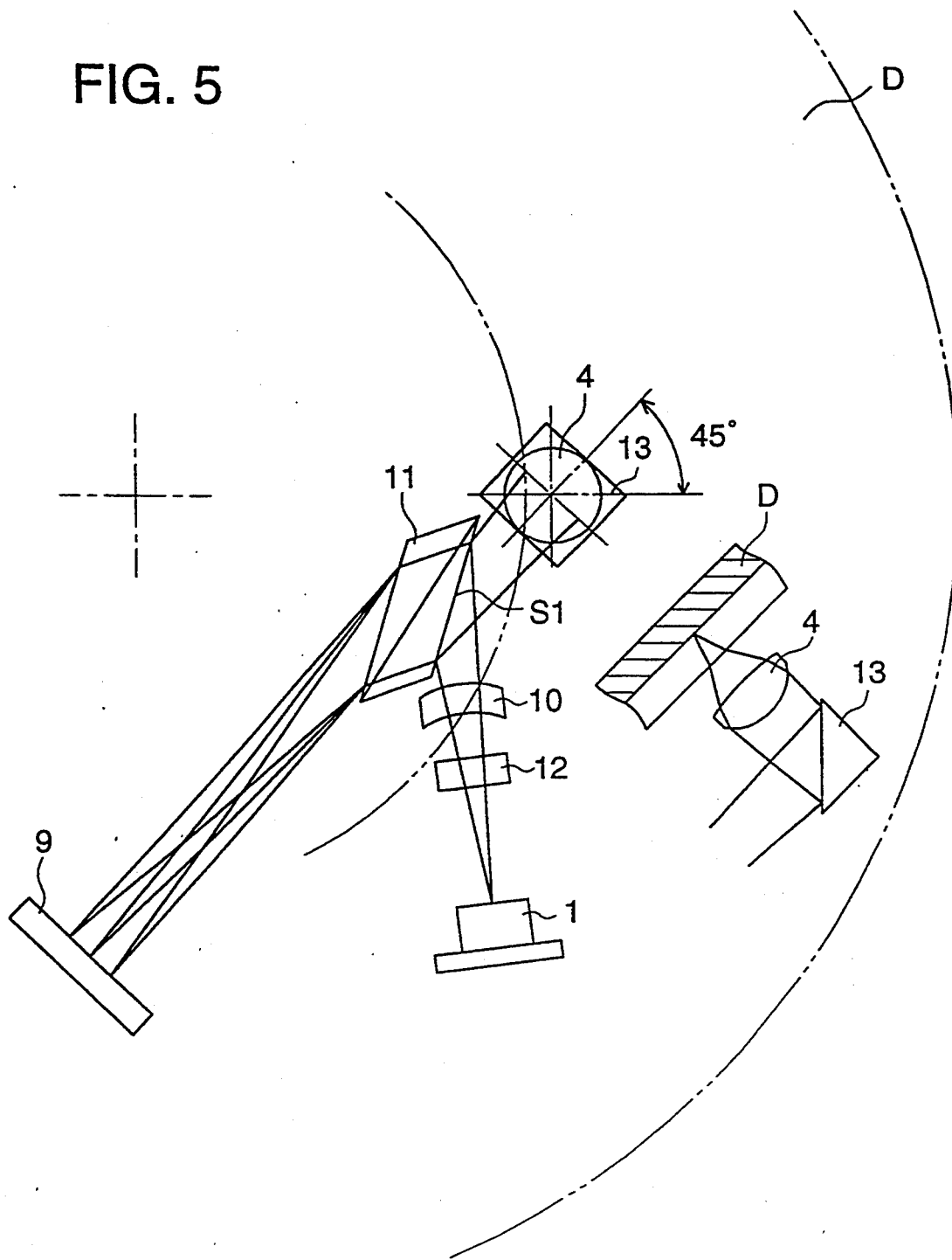
FIG. 5 is an optical arrangement plan showing other example of a magneto-optical head of the invention.

FIG. 5 shows a second example of the invention. This is a structural example wherein a three-beam method is used for detection of tracking errors. In general, a tracking error signal detecting method employing a three-beam method has an advantage, compared with a push-pull method in the first example, of a tracking servo that can be conducted stably even when eccentricity of a disk is caused remarkably. A laser beam emitted from semiconductor laser 1 is divided by diffraction grating 12 into three beams including zero-order light and ±1st-order light, then, passes coupling lens 10 and is moderated in terms of divergence angle by the coupling lens 10. The beams are then deflected by 90° in terms of the optical path by reflecting mirror 13 after reflecting on polarization-separation coating-coated surface S1 of birefringent polarizer 11, and finally converged on a recording surface of magneto-optical disk D by objective lens 4. A beam spot of the zero-order light is projected on a recording track of the disk D and ±1st-order light is projected on both sides of the recording track to be slightly away from each other in the direction of a radius of the disk. With regard to the diffraction grating 12, those having a light amount ratio by which the recording of magneto-optical signals on disk D is not affected by ±1st-order light are used. Three lines of light reflected on magneto-optical disk D are deflected from the aforesaid incident optical path by plane S1 of birefringent polarizer 11, and each beam is divided into 3 beams through birefringence of the birefringent polarizer as in the first example. In other words, 3 beams are divided into 9 beams in a form of a matrix in total which enter photodectector 9.

Figure 6:
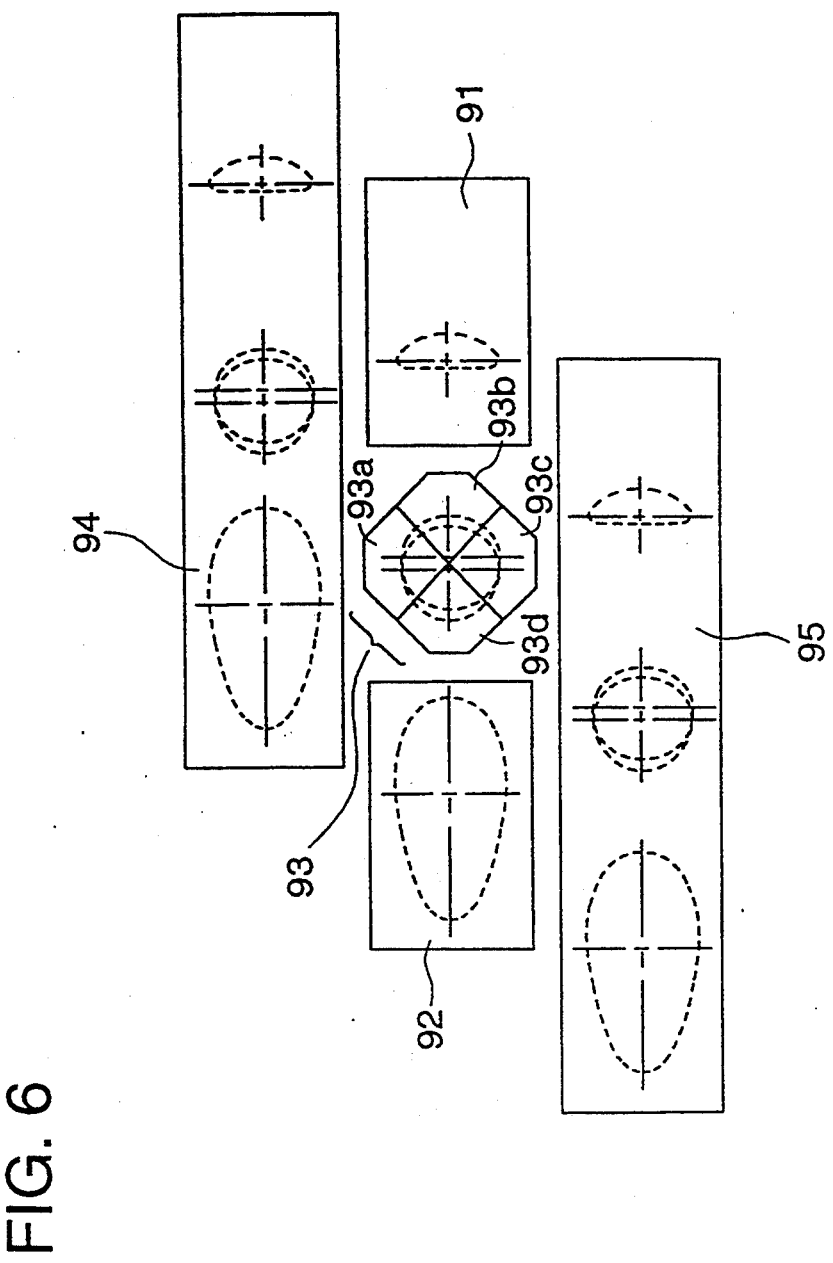
FIG. 6 is a top view showing an arrangement of a photodetecting element of a photodetector used in the other example of a magneto-optical head of the invention and showing a shape of a light spot.
Figure 7:
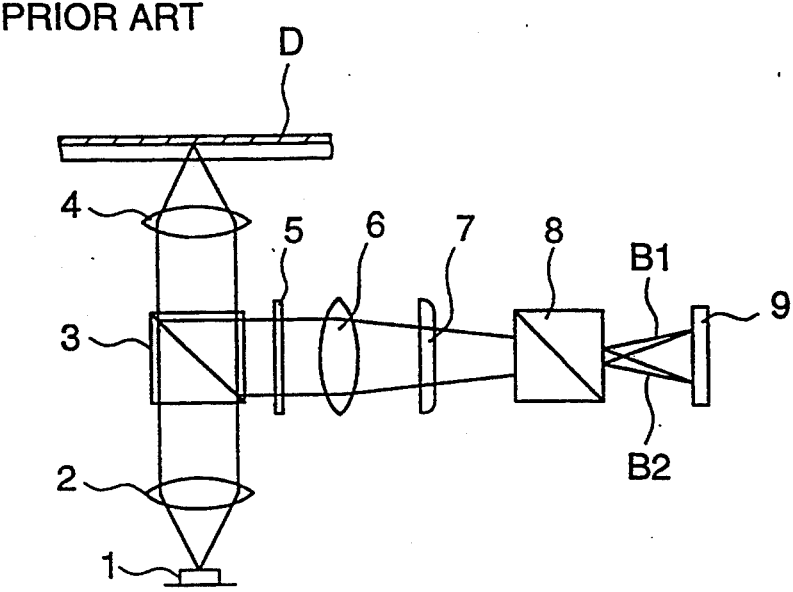
FIG. 7 is an optical arrangement plan of a magneto-optical head wherein a 2-beam-separation Wollaston prism in a prior art is used.
Figure 8:
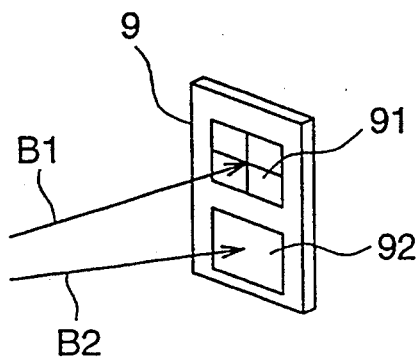
FIG. 8 is a perspective view showing an arrangement of a photodetecting element of a photodetector of the magneto-optical head in FIG. 7.
Figure 9:
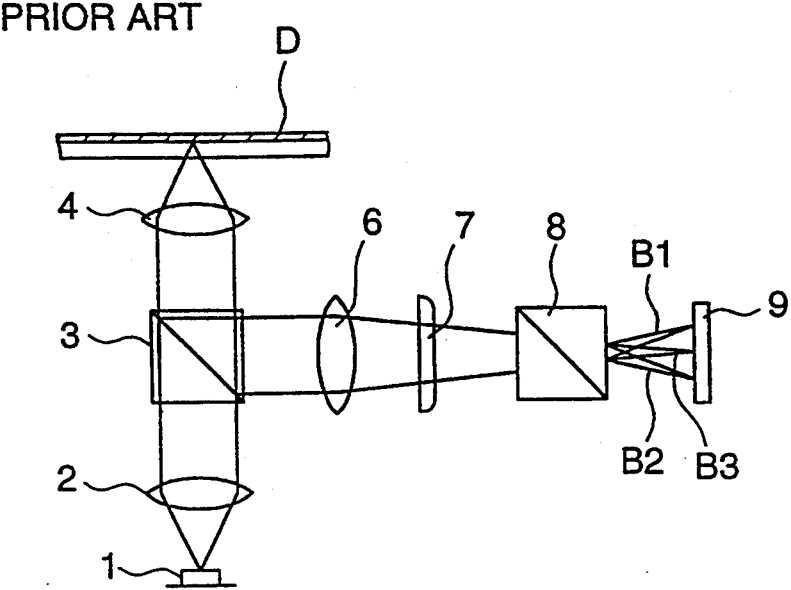
FIG. 9 is an optical arrangement plan of a magneto-optical head wherein a 3-beam-separation Wollaston prism in a prior art is used.
Figure 10:
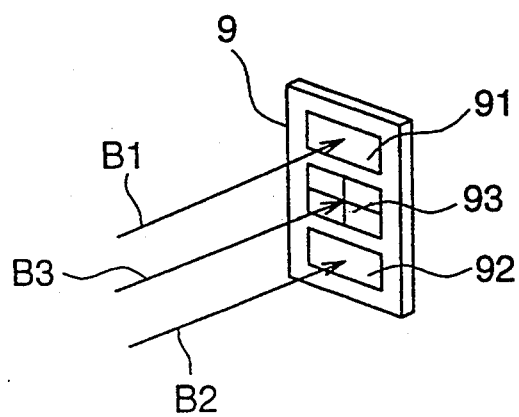
FIG. 10 is a perspective view showing an arrangement of a photodetecting element of a photodetector in the magneto-optical head shown in FIG. 9.

FIG. 6 shows a pattern of photodetecting elements on a photodetector. In this case again, an arrangement is made so that a plane containing a normal line to plane of incidence S1 of a birefringent polarizer and chief ray of an incident light is inclined at 45° to the tracking direction for the same reason as in the first example. Due to reflecting mirror 13, the actual arrangement is as shown in the illustration. In this example, focusing error signal (FE), tracking error signal (TE) and magneto-optical reproducing reproduction signal (MO) are expressed as follows.

$$FE=(93a+93c)-(93b+93d)$$

$$TE=94-95$$

$$MO=91-92$$

In the present example, reflecting mirror 13 is used for deflecting the direction of light by 90° because of a thinned magneto-optical head. When the size is sufficient, however, light may be guided to an objective lens directly without using a reflecting mirror.

In the first and second examples mentioned above, a birefringent polarizer is used to divide a beam into 3 beams. However, it is also possible to use a birefringent polarizer that divides a beam into 2 beams (for example, the birefringent polarizer used in the first example wherein $\phi_2$ is 90°). In this case, a magneto-optical head is one wherein at least one of two photodetecting elements which detect magneto-optical reproducing signals is used for detecting focusing error signals or tracking error signals.

In addition, the examples explained above represent an example wherein a finite conjugation objective lens is used. When using an infinite conjugation objective lens, a collimating lens is required between birefringent polarizer 11 and objective lens 4.

Both the first example and the second example employ a coupling lens to improve beam utilization efficiency for a laser beam and to improve polarization-separation characteristics of a polarization-separation coating (because a range of an incident angle to be considered is narrowed). However, the coupling lens does not required when the aforementioned efficiency and power do not present a problem.

As a material for a birefringent polarizer, it is possible to use optical members of uniaxial crystals such as calcite and lithium niobate.

As explained above, a magneto-optical head of the invention contains therein a birefringent polarizer that is composed of at least two cemented crystallines and has a plane of incidence on which a polarization-separation coating is formed and a plane of emergence, both planes being almost in parallel and facing each other. When the birefringent polarizer mentioned above is arranged so that the plane of incidence is inclined to the chief ray of convergent light, optical parts such as an expensive polarization beam splitter and a cylindrical lens for generating astigmatism unnecessary. This configuration attains cost reduction and downsizing of a magneto-optical-head.

What is claimed is:

1. A magneto-optical head for detecting information recorded magneto-optically in accordance with changes in polarization conditions of light reflected from a magneto-optical recording medium on which convergent light is projected, said magneto-optical head comprising:

(a) a birefringent polarizer comprising at least two crystallines which are cemented together, said polarizer having a plane of incidence on which a polarization-separation coating is formed and a plane of emergence provided substantially in parallel with the plane of incidence; and (b) a detector for detecting the polarized light reflected from said magneto-optical recording medium, wherein said birefringent polarizer is disposed to be inclined to an optical path along which the reflected light advances toward said detector so that a chief ray of reflected light from said recording medium enters the plane of incidence of the birefringent polarizer with an incident angle not less than 55° and not more than 70°, wherein the following conditions are satisfied:

$50\% \leq Rs \leq 85\%$, $Tp \geq 90\%$ and retardation $\leq 10°$ where Rs represents the s-polarized light reflectivity of the polarization-separation coating of said birefringent polarizer, Tp represents the p-polarized light transmissivity of the polarization-separation coating of said birefringent polarizer and retardation represents the transmission retardation between s-polarized light component and p-polarized light component.

2. The magneto-optical head of claim 1 further comprising a light source; and a coupling lens disposed between said birefringent polarizer and said light source for moderating an angle of divergent rays from the light source.

3. The magneto-optical head of claim 1, wherein said birefringent polarizer is disposed so that a plane of said birefringent polarizer that includes an imaginary line normal to said plane of incidence and a chief ray of incident light is positioned at 45° to a recording track direction of said recording medium.

4. The magneto-optical head of claim 1, wherein said birefringent polarizer is provided so that a first surface which includes a chief ray of incident light and an optic axis of one of said at least two crystallines has a predetermined angle, which is not right angle, with a second surface which includes said chief ray of incident light and an optic axis of the other of said at least two crystallines, and one of the optic axis of said at least two crystallines of said birefringent polarizer is disposed to be inclined to a direction of linear polarization of the incident light with an angle of substantially 45° to obtain either three or four separated rays.

5. The magneto-optical head of claim 1, wherein said birefringent polarizer is provided so that an optic axis of one of said at least two crystallines is disposed substantially perpendicular to the direction of a refracted ray that crosses said plane of incidence.

6. The magneto-optical head of claim 1, wherein said birefringent polarizer is disposed to be inclined to an optical path along which the reflected light advances toward said detector so that a chief ray of reflected light from said recording medium enters the plane of incidence of the birefringent polarizer with an incident angle not less than 60°.

7. The magneto-optical head of claim 6 further comprising a light source; and a coupling lens disposed between said birefringent polarizer and said light source for moderating an angle of divergent rays from the light source.

8. The magneto-optical head of claim 6, wherein said birefringent polarizer is disposed so that a plane of said birefringent polarizer that includes an imaginary line normal to said plane of incidence and a chief ray of incident light is positioned at 45° to a recording track direction of said recording medium.

9. The magneto-optical head of claim 6, wherein said birefringent polarizer is provided so that a first surface which includes a chief ray of incident light and an optic axis of one of said at least two crystallines has a predetermined angle, which is not right angle, with a second surface which includes said chief ray of incident light and an optic axis of the other of said at least two crystallines, and one of the optic axis of said at least two crystallines of said birefringent polarizer is disposed to be inclined to a direction of linear polarization of the incident light with an angle of substantially 45° to obtain either three or four separated rays.

* * * * *